June 7, 1932.    W. A. AHERN    1,861,519
WATER HEATER
Filed Nov. 21, 1928
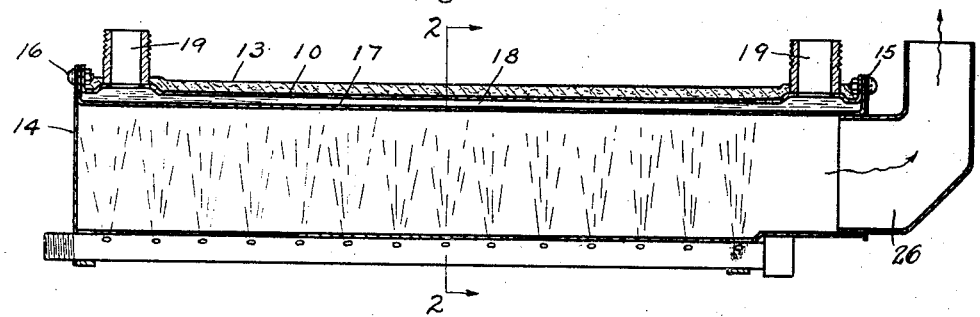
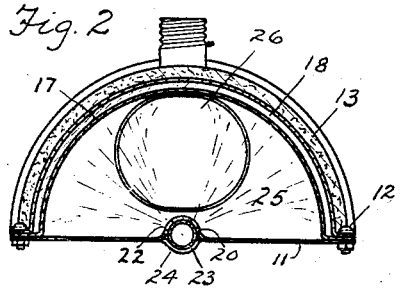
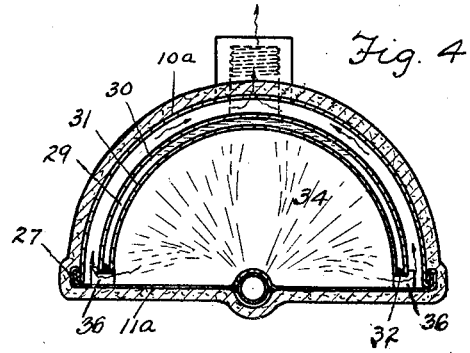
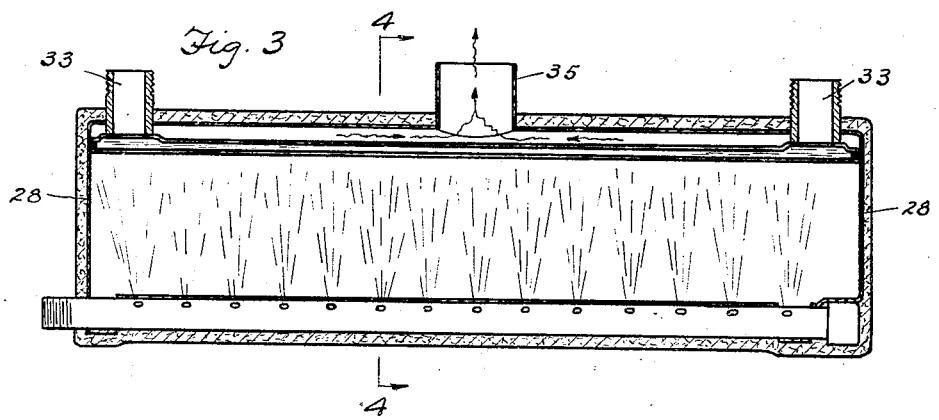
William Albert Ahern
INVENTOR Patented June 7, 1932

1,861,519

UNITED STATES PATENT OFFICE

WILLIAM ALBERT AHERN, OF WORCESTER, MASSACHUSETTS

WATER HEATER

Application filed November 21, 1928. Serial No. 320,883.

This invention relates to water heaters especially adapted for household use, an object being to provide means for heating a maximum amount of water within a minimum time and at a relatively small expense.

Another object of the invention is the provision of a water heater of simple and economical construction, and which may be readily taken apart and reassembled for cleaning and repair.

With the above and other objects in view, the invention further includes the following novel features and details of construction, to be hereinafter more fully described, illustrated in the accompanying drawing and pointed out in the appended claim.

In the drawing:—

Figure 1 is a sectional view of a water heater constructed in accordance with the invention.

Figure 2 is a section on the line 2—2 of Figure 1.

Figure 3 is a longitudinal sectional view showing a slightly different form of the heater.

Figure 4 is a section on the line 4—4 of Figure 3.

Referring to the drawing in detail wherein like characters of reference denote corresponding parts, the heater shown comprises a housing which, in Figure 1, includes an outer semi-circular wall 10 whose edges are connected by a bottom wall 11, the edges of these walls being bolted together as indicated at 12. The wall 10 is covered with a suitable heat insulating material indicated at 13, and if desired, the bottom 11 may be likewise covered. The housing further includes end walls 14 and 15, these end walls being secured in place by means of bolts 16 which pass through flanges provided around the ends of the outer wall 10.

Located within the housing is an inner semi-circular wall 17 whose side edges are flanged as shown in Figure 2 and are secured by the bolts 12 between the flanges of the outer wall and the bottom 11. The ends of the inner wall 17 are also flanged as shown in Figure 1 and these flanges are secured to the bolt 16 between the flanges of the outer wall 13 and the ends 14 and 15. The walls 10 and 17 are spaced relatively close together and provide a substantially semi-circular thin water chamber 18 having inlet and outlet ports 19, the spacing between the walls 10 and 17 being just sufficient to permit a thin sheet of water to flow therebetween.

Extending longitudinally of the bottom is a substantially semi-circular raised portion 20 which is disposed concentrically of the semi-circular chamber 18 and is provided with openings 22. Seated within this raised portion is a burner 23, for gas, oil, or other combustible fluid so as to provide a source of heat. While the heater is shown in connection with a burner of this type, it is of course obvious that an electric heating unit may be substituted. The burner is held in place by means of straps 24.

The space within the housing between the inner wall 17 and the bottom 11 defines a heating chamber 25 so that the heat from the burner may spread outwardly against the entire surface of the inner wall 17, while a vent or flue 26 extends from this chamber at one end of the heater.

When the burner 23 is ignited the flame therefrom will spread outwardly and heat the inner wall 17 of the water chamber 18, the concave form of the inner wall 17 serving to trap the heat from the burner so that there is a rapid transfer of heat through the wall 17 to the thin sheet of water in the chamber 18. Due to the thinness of the chamber 18, the water therein heats very rapidly so that almost as soon as the burner is turned on the water starts to flow in a thin stream at considerable velocity through the entire chamber 18 and supplies hot water at the faucet connected to the outlet port 19. As a result of this rapid heating of the water and its quick passage through the chamber 18, there is no possibility of the formation of a film of steam around the heated wall 17, as would occur with a water chamber of greater thickness. Furthermore, there is no tendency for the water in the chamber 18 to deposit scale on the walls 10 and 17, since the water after being heated does not remain in the chamber long enough to deposit scale. The relatively high velocity of the heated water passing through the chamber 18 also helps to prevent the deposit of scale.

In Figs. 3 and 4 of the drawing there is shown a modified arrangement in which the heated gases are caused to come into contact with both sides of the semi-circular water chamber. In this modified arrangement, the outer wall 10a is joined to the bottom 11a by crimping the edges as shown at 27, while the ends 28 are secured to the outer wall and bottom by any suitable means, such as welding.

The water chamber 29 is formed by thin substantially semi-circular walls 30 and 31 which are spaced relatively close together and have their longitudinal edges closed by means of wires 32 preferably welded in place. This water chamber is provided with inlet and outlet ports 33 while the heat chamber 34 is provided with a central outlet or vent 35.

As shown in Fig. 4, the water chamber 29 is spaced from the wall 10a of the housing so as to leave a semi-circular passage between the outer chamber wall 30 and the housing wall 10a. The lower edges of the chamber 29 are supported above the bottom 11a of the housing by spacers 36 which are disposed at intervals along the length of the chamber 29 so as to permit hot gases, deflected downwardly by the wall 31, to pass between them, as indicated by the arrows. The gases then pass upwardly in the space between the water chamber wall 30 and the housing wall 10a finally passing into the outlet vent 35. With the arrangement shown in Fig. 4 it is evident that there will be a very complete transfer of heat between the hot gases and the opposed walls 30 and 31 of the water chamber 29 so that very little heat remains in the gases escaping through the vent 35. With both walls 30, 31 of the chamber 29 subjected to heat, a very rapid heating of the thin sheet of water included therebetween takes place with an increased velocity of flow, as compared to the water chamber 18, with only one wall heated.

The invention is susceptible to various changes in its form, proportions and minor details of construction and the right is herein reserved to make such changes as properly fall within the scope of the appended claim.

Having described the invention what is claimed is:

A water heater comprising a semi-cylindrical housing, a burner extending along the central longitudinal axis of said housing, a semi-cylindrical water chamber symmetrically disposed within said housing with respect to said burner, said water chamber being defined by closely spaced walls of thin conducting material and means for admitting and discharging water at opposite ends of said chamber, the space between said burner and the inner wall of said water chamber being entirely clear whereby heated gases from said burner spread radially and impinge directly upon the inner chamber wall and the water chamber being spaced from said housing to permit the passage of heated gases around the ends of the chamber and upwardly between the housing and the outer chamber wall.

In testimony whereof I affix my signature.

WILLIAM ALBERT AHERN.